United States Patent [19]

Martin et al.

[11] Patent Number: 5,104,950
[45] Date of Patent: Apr. 14, 1992

[54] OLEFIN POLYMERIZATION

[75] Inventors: Shirley J. Martin; Max P. McDaniel; Conroy, Brian K.; Joel L. Martin, all of Bartlesville, Okla.

[73] Assignee: Phillips Petroleum Company, Bartlesville, Okla.

[21] Appl. No.: 628,038

[22] Filed: Dec. 17, 1990

Related U.S. Application Data

[62] Division of Ser. No. 501,056, Mar. 29, 1990, Pat. No. 5,021,379.

[51] Int. Cl.$^5$ .............................................. C08F 4/52
[52] U.S. Cl. .................................... 526/129; 526/142; 502/102
[58] Field of Search .................. 526/129, 142, 164

[56] References Cited

U.S. PATENT DOCUMENTS 4,575,538  3/1986  Hsieh et al. ..................... 526/142

Primary Examiner—Patrick P. Garvin
Assistant Examiner—Brent M. Peebles
Attorney, Agent, or Firm—Edward L. Bowman

[57] ABSTRACT

A lanthanide based olefin polymerization catalyst and its use in polymerization are disclosed. The lanthanide based catalyst is prepared by contacting a lanthanide halide with an ether, then contacting the resulting lanthanide composition with an alkali or alkaline earth metal alkyl compound, and depositing the resulting lanthanide product on a particulate support.

17 Claims, No Drawings in# OLEFIN POLYMERIZATION

This application is a division of application Ser. No. 07/501,056, filed Mar. 29, 1990, now U.S. Pat. No. 5,021,379.

FIELD OF THE INVENTION

This invention relates to the polymerization of olefins. In a more specific aspect the present invention relates to a catalyst, catalyst preparation, and use of the catalyst in the polymerization of olefins.

BACKGROUND OF THE INVENTION

U.S. Pat. No. 3,111,511 and U.S. Pat. No. 3,429,864 both disclose polymerizations of ethylene using the combination of a rare earth metal halide and an organometallic compound. Many of these prior art catalyst systems have relatively low activity and, as a result, research continues in an effort to improve the catalyst systems.

The present invention is concerned with new high productivity catalysts which employ rare earth metal halides as one of the catalyst components for the production of polymers from olefins. Accordingly, an object of the present invention is to provide an improved polymerization catalyst.

A further object of this invention is to provide an improved process for the production of olefin polymers. Still another object of the present invention is to provide a method for producing a new rare earth metal halide based catalyst. Other objects, aspects, and advantages of the present invention will be apparent to those skilled in the art upon reading the specification and the appended claims.

SUMMARY OF THE INVENTION

In accordance with the present invention a rare earth metal containing catalyst is produced by contacting a lanthanide halide with an ether in a suitable diluent, then contacting the resulting lanthanide composition with an alkali or alkaline earth metal alkyl compound which is stabilized against beta-hydride elimination, and depositing the resulting lanthanide-containing product on a particulate support.

In accordance with another embodiment of the present invention the lanthanide-containing catalyst is employed in the polymerization of olefins.

DETAILED DESCRIPTION OF THE INVENTION

The catalyst of the present invention is formed from a lanthanide halide. The term lanthanide halide as used herein refers to the halides of the rare earth metals, i.e. the metals having atomic numbers 39 and from 57 to 71, inclusive. Some specific examples of such lanthanide halides include gadolinium chloride, dysprosium chloride, terbium chloride, yttrium chloride, samarium chloride, erbium chloride, lanthanum chloride, cerium chloride, neodymium chloride, europium chloride, holmium chloride, and the like.

In preparing the catalyst the lanthanide halide is combined with an ether in a suitable diluent. The conditions under which the lanthanide halide and the ether are contacted are such that a solution or suspension is formed. Generally, the contacting would be conducted at a temperature in the range of about −80° C. to about 150° C., more preferably in the range of about −80° C. to about 30° C., for a period of time ranging from about 1 minute to about 72 hours, preferably about 10 minutes to about 24 hours. The lanthanide halide and the ether are normally mixed together in a suitable dry solvent or diluent. Typical solvents or diluents include, for example, normally liquid hydrocarbons having three to twelve carbon atoms such as propane, n-pentane, cyclohexane, n-heptane, methylcyclohexane, toluene, and the like, and mixtures thereof. Generally, the amount of solvent or diluent employed can vary over a broad range. Typically, the amount of solvent or diluent would be in the range of about 1/1 to about 300/1 grams of solvent per gram of rare earth metal halide or higher.

The ether that is contacted with the lanthanide halide can be selected from the cyclic or straight chain ethers having 2 to 10 carbon atoms. Some examples of such ether compounds include diethyl ether, tetrahydrofuran, tetrahydropyran, 1,4-dioxane, ethylene oxide, 1,2-propylene oxide, and the like. The currently preferred ether is tetrahydrofuran.

The mole ratio of the ether to the lanthanide halide has been found to affect the productivity of the final catalyst. Generally it is preferred for the best results to employ a mole ratio of ether to lanthanide halide of at least about 3:1. The optimum upper limit for the amount of ether can be determined by routine experimentation. The employment of excess ether is not considered to generally adversely affect the productivity of the final catalyst.

The solution or slurry of the lanthanide halide/ether complex is then contacted with the alkali or alkaline earth metal alkyl compound.

The alkali or alkaline earth metal alkyl compounds employed in this step are those of the formula $MR_x$ wherein M is the alkali or alkaline earth metal, x equals the valence of the metal M, and R is an alkyl radical in which there is no hydrogen attached to the beta atom of the alkyl group. Such compounds will be referred to herein as beta-hydride elimination stabilized metal alkyls. Typically M would be selected from lithium and magnesium. Some examples of typical R groups would include trimethylsilylmethyl, neopentyl, benzyl, bis(trimethylsilyl)methyl, 2-phenyl-2-methyl propyl, and the like.

After the lanthanide halide/ether complex is reacted with trimethylsilylmethyl the resulting slurry or solution is contacted with a suitable particulate support under conditions sufficient to deposit the resulting lanthanide product on the particulate support. Normally this can be done at normal ambient temperatures. Examples of materials which can be used as particulate supports include calcined silica, alumina, silica-aluminas, aluminophosphates, kieselguhr, and the like. The optimum calcining conditions can be readily determined by routine experimentation. The currently preferred support is highly porous alumina containing at least about 90 weight percent alumina and having an internal porosity of at least about 0.5 ml/gm as determined by the BET technique described by S. Brunauer, P. Emmett, and E. Teller, in J. Am. Chm. Soc., 60, p. 309–319 (1938) or some comparable technique. The porous alumina preferably contains at least 90 weight percent aluminum oxide and most preferably at least 99 weight percent aluminum oxide. Most preferably the aluminum oxide is one that has been subjected to a thermal treatment prior to being contacted with the lanthanide-containing product. Such thermal treatments are generally carried out at temperatures in the range of about 100° C.

to about 1000° C., more preferably about 300° C. to about 800° C.

The amount of support employed can vary over a wide range. Generally, however, it is desirable to employ the support in an amount such that the weight ratio of the lanthanide metal to the support is in the range of 0.005 to 0.2. Generally, the catalyst would contain about 0.1 to about 2 millimoles of lanthanide metal per gram of support.

The combining of the lanthanide product with the support can be carried out in any suitable manner. Generally, the support is merely mixed with the slurry or solution resulting from the reaction of the β-stable metal alkyl compound with the lanthanide halide/ether complex. The temperature employed in this step is not considered critical. Normal ambient temperature would generally be employed. After the contacting the resulting solid can be rinsed in a suitable diluent such as a hydrocarbon and/or dried for later use.

Surprisingly, this inventive catalyst can be employed in the polymerization of olefins without the use of an additional organometallic cocatalyst.

The process for polymerizing olefins using the inventive catalyst composition can be carried out in batch type, semi-continuous type, or continuous type reactor.

Any ethylenically unsaturated hydrocarbon or mixtures thereof may be polymerized using the catalyst of this invention. The invention is of particular importance for the polymerization of mono-ethylenically unsaturated hydrocarbon known as alpha-olefins. Some examples of such olefins include ethylene, propylene, butene-1, hexene-1, heptene-1, octene-1, 4-methyl-1-pentene, octene-1, octadecene-1, and the like. With the more volatile monomers, a diluent is usually preferred. Any inert liquid organic solvent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons. The selection of temperature and pressure for the polymerization process will obviously also depend upon the monomer, the activity of the particular catalyst system being used, the degree of polymerization desired, etc. In general, polymerizations will be carried out at room temperature or slightly above, but any temperature within the range of about −50° C. to about 150° C., more preferably about −20° C. to about 100° C. could be used. In the same way, while atmospheric pressure or a pressure of only a few pounds may be used, the polymerization may be carried out over a wide range of pressures, as for example, from a partial vacuum to about 1000 pounds and preferably from atmospheric to about 500 pounds.

These catalysts appear to be rather unique in that the addition of hydrogen into the polymerization has been found to increase the activity of the catalyst. Accordingly, in a preferred embodiment for the polymerization the presence of hydrogen is desirable.

A further understanding of the present invention and its objects and advantages will be provided by a review of the following specific examples of embodiments of the present invention.

EXAMPLE 1

A series of catalysts were prepared using various anhydrous lanthanide halides, tetrahydrofuran, and various supports. The catalysts were prepared by slurrying the lanthanide halide in a hydrocarbon with the tetrahydrofuran and then reacting the resulting complex with trimethylsilylmethyl lithium. The resulting liquid was then contacted with different types of supports which have been subjected to different activation conditions. The resulting catalysts were then evaluated in the polymerization of ethylene. The results of the tests are reported in Tables 1 through 4 which follow. In the tables, the term Ketjen B refers to grade B alumina available from Ketjen. Ketjen L refers to grade L silica alumina available from Ketjen and Ketjen G refers to grade G alumina available from that source. The term HPV refers to high pore volume alumina obtained from Davison, and the term 952 refers to 952 grade silica obtained from Davison.

TABLE 1

| Run No. | Metal | THF: Metal | mmole metal per g. of support | Support[a] | Activation of Support (°C.) | Polym. Temperature (°C.) | $H_2$ (Psig) | Yield[b] (g/g-min) | Activity (g/mmole metal-hr) |
|---|---|---|---|---|---|---|---|---|---|
| 1 | Gd | 6.5:1 | .38 | Ketjen B | 800 | 95 | 0 | 121/50 | 382 |
| 2 | Gd | 6.5:1 | .38 | Ketjen B | 800 | 95 | 350 | 147/50 | 464 |
| 3 | Gd | 6.5:1 | .38 | Ketjen B | 800 | 85 | 350 | 351/60 | 924 |
| 4 | Gd | 3:1 | .95 | HPV | 800 | 85 | 0 | 636/50 | 803 |
| 5 | Gd | 3:1 | .95 | HPV | 800 | 85 | 350 | 843/50 | 1065 |
| 6 | Gd | 3:1 | .64 | HPV | 800 | 85 | 0 | 417/50 | 782 |
| 7 | Gd | 3:1 | .64 | HPV | 800 | 85 | 350 | 606/50 | 1136 |
| 8 | Dy | 12:1 | .37 | Ketjen B | 800 | 85 | 0 | 41/50 | 133 |
| 9 | Dy | 12:1 | .37 | Ketjen B | 800 | 85 | 350 | 40/50 | 130 |
| 10 | Dy | 3:1 | .93 | HPV | 800 | 85 | 350 | 302/51 | 382 |
| 11 | Tb | 102:1 | .37 | Ketjen B | 800 | 85 | 0 | 45/51 | 143 |
| 12 | Tb | 102:1 | .37 | Ketjen B | 800 | 85 | 350 | 40/50 | 130 |
| 13 | Tb | 3:1 | .94 | HPV | 800 | 85 | 350 | 221/50 | 282 |
| 14 | Y | 13:1 | .675 | Ketjen B | 800 | 85 | 0 | 68/50 | 121 |
| 15 | Y | 13:1 | .675 | Ketjen B | 800 | 85 | 350 | 62/50 | 110 |
| 16 | Y | 3:1 | 1.69 | HPV | 800 | 85 | 350 | 112/50 | 80 |
| 17 | Sm | 3:1 | .998 | HPV | 800 | 85 | 350 | 91/52 | 105 |
| 18 | Er | 0:1 | .18 | Ketjen B | 600 | 95 | 0 | 11.5/65 | 59 |
| 19 | La | 15.7:1 | .43 | Ketjen B | 800 | 95 | 0 | 2.4/60 | 5.6 |
| 20 | Ce | 37:1 | .214 | HPV | 800 | 85 | 0 | 4.2/48 | 24.5 |
|  |  | 3:1 | .998 | HPV | 800 | 85 | 0 | Trace |  |
| 21 | Pr | 18.8:1 | .326 | Ketjen B | 800 | 85 | 0 | 1/26 | 7.1 |
| 22 | Nd | 23.7:1 | .416 | Ketjen B | 800 | 85 | 0 | 2/32 | 9.0 |
| 23 | Eu | 19.6:1 | .395 | Ketjen B | 600 | 95 | 0 | 1/60 | 2.5 |

TABLE 1-continued

| Run No. | Metal | THF: Metal | mmole metal per g. of support | Support[a] | Lanthanide Metals Activation of Support (°C.) | Polym. Temperature (°C.) | $H_2$ (Psig) | Yield[b] (g/g-min) | Activity (g/mmole metal-hr) |
|---|---|---|---|---|---|---|---|---|---|
| 24 | Ho | 15.9:1 | .364 | Ketjen B | 800 | 85 | 0 | 0 | |

[a]HPV = Davison High Pore Volume Alumina
Ketjen B = Ketjen Grade B alumina
[b]Yield is in units of grams of polymer/gram of supported cat./minute.

Table I demonstrates that a wide variety of lanthanide halides can be employed to make an active catalyst. Gadolinium trichloride provided the best results followed by dysprosium, terbium, yttrium, and samarium chlorides.

Table 1 also shows that these catalysts behave somewhat differently from most other olefin polymerization catalysts in that they become more active in the presence of hydrogen. The polymers produced in the absence of hydrogen displayed ultra high molecular weight; but, commercial range melt indexes are obtained when hydrogen is employed in the polymerization.

Table 2 shows some of the properties of polymers obtained with some of the catalysts prepared according to the present invention.

TABLE 2

| | | Polymer Properties | | | | |
|---|---|---|---|---|---|---|
| Run No. | Metal | Support | THF: Metal | MI | HLMI | IV |
| 1 | Gd | Ketjen | 6.5:1 | 0 | 0 | 12.8 |
| 2 | Gd | Ketjen B | 6.5:1 | 2.64 | 274 | 1.71 |
| 3 | Gd | Ketjen B | 6.5:1 | 0.81 | 91.5 | 5.71 |
| 4 | Gd | HPV | 3:1 | 0 | 0 | 12.8 |
| 5 | Gd | HPV | 3:1 | 0.28 | 30.6 | 2.14 |
| 6 | Gd | HPV | 3:1 | 0 | 0 | 14.7 |
| 7 | Gd | HPV | 3:1 | 0.71 | 19.7 | 2.29 |
| 8 | Dy | Ketjen B | 12:1 | 0.23 | 22.6 | — |
| 9 | Dy | Ketjen B | 12:1 | 18.1 | — | 1.49 |
| 10 | Dy | HPV | 3:1 | 4.96 | 320 | — |
| 11 | Tb | Ketjen B | 102:1 | 0 | 0 | 20.74 |
| 12 | Tb | Ketjen B | 102:1 | 39.8 | — | 1.07 |
| 13 | Tb | HPV | 3:1 | 0.95 | 76 | 2.15 |
| 14 | Y | Ketjen B | 13:1 | 0 | 0 | 20.5 |
| 15 | Y | Ketjen B | 13:1 | 6.6 | — | 1.32 |
| 16 | Y | HPV | 3:1 | 12.1 | 699 | 57.5 |
| 17 | Sm | HPV | 3:1 | 0.82 | 80.9 | 2.37 |

It was noted that the densities of the polymers obtained using the Gd catalysts were unusually high for the melt index values observed. The ESCR is quite good considering the high density and stiffness. The resulting polymers are almost entirely saturated as judged by infrared spectroscopy.

Table 3 shows the results obtained with a series of catalysts prepared using different THF to gadolinium trichloride ratios.

TABLE 3

| THF Concentration Using Gadolinium Trichloride and Ketjen B | | | | | |
|---|---|---|---|---|---|
| THF:Gd | Mmoles of metal per g. support | Support Activation (°C.) | Polymerization Temperature (°C.) | Yield (g/g-min) | Activity (g/mmole Gd-Hr) |
| 0:1 | .3 | 800 | 85 | 3.6/38 | 15 |
| 1:1 | .64 | 800 | 85 | 0 | 0 |
| 3:1 | .64 | 800 | 85 | 192/50 | 360 |
| 6:1 | .64 | 800 | 85 | 179/50 | 336 |
| 13:1 | .64 | 800 | 85 | 65/50 | 122 |
| 29:1 | .29 | 800 | 85 | 127/51 | 515 |
| 29:1 | .29 | 800 | 85 | 125/58 | 446 |
| 9.4:1 | .25 | 800 | 85 | 136/51 | 640 |
| 6.5:1 | .38 | 800 | 85 (350 PSI $H_2$) | 351/60 | 924 |
| 6.5:1 | .38 | 600 | 95 | 30/53 | 89 |
| 6.5:1 | .38 | 600 | 95 (175 PSI $H_2$) | 33/51 | 102 |
| 11.5:1 | .38 | 600 | 95 | 8.8/36 | 39 |
| 11.5:1 | .38 | 600 | 85 | 11.9/39 | 48 |

Without ether the metal chloride reacted slowly or not at all and polymerization activity was usually poor or none. The data also demonstrates that much higher activity is obtained if the Ketjen B is activated at 800° C. rather than at 600° C.

Table 4 shows the results obtained with an inventive catalyst prepared using gadolinium trichloride and various types of supports.

TABLE 4

| Various High Surface Area Supports (Gadolinium Catalyst) | | | | | | |
|---|---|---|---|---|---|---|
| THF:Gd | mmoles of metal per g. support | Support[a] | Support Activation (°C.) | Polymerization Temperature (°C.) | Yield (g/g-min) | Activity (g/mmoles-hr) |
| 6.5:1 | .38 | Ketjen B | 600 | 95 | 30/53 | 89 |
| 6.5:1 | .38 | Ketjen B | 800 | 95 | 121/50 | 382 |
| 6.5:1 | .38 | 8% $NH_4F \cdot HF$ on Ketjen B Silica | 500 | 95 | 0 | 0 |
| 6.5:1 | .38 | 952 | 800 | 95 | 7.4/40 | 29 |
| 9.4:1 | .254 | Ketjen B | 800 | 85 | 136/51 | 630 |
| 9.4:1 | .254 | Ketjen B | 900/CO | 85 | 139/54 | 608 |
| 6.5:1 | .38 | Ketjen L | 800 | 95 | 10/40 | 40 |
| 11.5:1 | .191 | 952 | 600 | 95 | 12/80 | 47 |
| 3:1 | .64 | Ketjen B | 800 | 85 | 192/50 | 360 |
| 3:1 | .64 | HPV | 800 | 85 | 417/50 | 782 |
| 11.5:1 | .38 | Ketjen B | 600 | 95 | 8.8/36 | 39 |
| 3:1 | .95 | HPV | 800 | 85 (350 PSI $H_2$) | 843/50 | 1065 |
| 3:1 | .95 | Ketjen G Silica | 800 | 85 (350 PSI $H_2$) | 282/50 | 356 |
| 3:1 | .95 | 952 | 300 | 85 | 15/44 | 22 |

TABLE 4-continued

| | Various High Surface Area Supports (Gadolinium Catalyst) | | | | | |
|---|---|---|---|---|---|---|
| THF:Gd | mmoles of metal per g. support | Support[a] | Support Activation (°C.) | Polymerization Temperature (°C.) | Yield (g/g-min) | Activity (g/mmoles-hr) |
| 4:1 | — | None | | (350 PSI $H_2$) 85 (350 PSI $H_2$) | Trace | |
| 6.5:1 | .38 | Ketjen B | 800 | 85 (350 PSI $H_2$) | 351/60 | 924 |

[a]952 = Davison Grade 952 silica
HPV = Davison high PV alumina
Ketjen B = Ketjen Grade B alumina
Ketjen L = Ketjen Grade L silica-alumina
Ketjen G = Ketjen Grade G alumina Table 4 shows that alumina is by far the preferred support, especially if calcined at a high temperature such as 800° C. Fluorided alumina did not produce an active catalyst. Treating an alumina with carbon monoxide did not provide any particular improvement. In addition the support appears to be necessary. Note that only a trace of polymer was produced when polymerization was attempted using the trimethylsilylmethyl/-gadolinium product without a support.

Table 5 shows a series of catalysts which were prepared using a lanthanide metal halide and various metal alkyls.

Table 5 shows that butyl alkyls and Gringard reagents such as benzylmagnesium chloride were not as effective as the trimethylsilylmethyl lithium.

Table 6 summarizes the results obtained using inventive catalysts with or without cocatalysts.

TABLE 6

| | | | | | Cocatalysts in the Reactor | | | | |
|---|---|---|---|---|---|---|---|---|---|
| Metal | THF to Metal Ratio | mmoles of metal per g support | Support | Support Activation (°C.) | Polymerization Temp (°C.) | Cocat/PPM | Yield (g/g-min) | Activity (g/mmole-hr) | MI |
| Gd | 6.5:1 | .38 | Ketjen B | 800 | 95 | None | 30/50 | 95 | |
| Gd | 6.5:1 | .38 | Ketjen B | 800 | 95 | TEA/20 | 27/50 | 85 | |
| Y | 13:1 | .675 | Ketjen B | 800 | 85(350 PSIH$_2$) | None | 62/50 | 110 | 6.6 |
| Y | 13:1 | .675 | Ketjen B | 800 | 85(350 PSIH$_2$) | TEA/20 | 55/50 | 98 | 9.9 |
| Y | 3:1 | 1.69 | HPV | 800 | 85(350 PSIH$_2$) | None | 112/50 | 80 | 12.1 |
| Y | 3:1 | 1.69 | HPV | 800 | 85(350 PSIH$_2$) | TEA/5.8 | 105/50 | 75 | 15.7 |
| Y | 3:1 | 1.69 | HPV | 800 | 85(350 PSIH$_2$) | DEZ/5.8 | 70/40 | 62 | 53.0 |

The results of Table 6 show that the inventive catalysts are effective in the presence of organoaluminum or organozinc cocatalysts but that the cocatalysts do not provide any particular improvement in productivity.

Table 7 sets forth a series or runs using inventive catalysts at various polymerization temperatures.

TABLE 7

| | | | Reactor Temperature as a Variable | | | |
|---|---|---|---|---|---|---|
| THF:Gd | mmoles of metal per g. support | Support | Support Activation (°C.) | Polymerization Temperature (°C.) | Yield (g/g-min) | Activity (g/mmoles-hr) |
| 6.5:1 | .38 | Ketjen B | 800 | 95(350 psi H$_2$) | 147/50 | 464 |
| 6.5:1 | .38 | Ketjen B | 800 | 85(350 psi H$_2$) | 351/60 | 923 |
| 9.4:1 | .254 | Ketjen B | 800 | 85 | 136/51 | 630 |
| 9.4:1 | .254 | Ketjen B | 800 | 75 | 165/51 | 764 |
| 5.7:1 | .95 | HPV | 800 | 85 | 138/45 | 194 |
| 5.7:1 | .95 | HPV | 800 | 40 | 80/50 | 101 |
| 3:1 Sm | .998 | HPV | 800 | 89(350 psi H$_2$) | 68/52 | 79 |
| 3:1 Sm | .998 | HPV | 800 | 85(350 psi H$_2$) | 91/52 | 105 |
| 3:1 Sm | .998 | HPV | 800 | 26-34 | 16/77 | 12 | alkyls.

Table 8 summarizes the effect observed by varying the amount of active metal contained in the support.

TABLE 5

| | Alkyls Reacted With Lanthanide Metal Chlorides | | | | | | |
|---|---|---|---|---|---|---|---|
| Metal | Alkyl | mmoles of metal per g support | Support | Support Activation (°C.) | Polymerization Temp (°C.) | Yield (g/g-min) | Activity (g/mmole-hr) |
| Gd | Trimethylsilylmethyllithium | .25 | Ketjen B | 800 | 85 | 136/51 | 640 |
| Gd | Butyllithium | .25 | Ketjen B | 800 | 85 | 3/56 | 13 |
| Gd | Benzylmagnesiumchloride | .64 | Ketjen B | 800 | 85 | 1/25 | 4 |
| Gd | Methylmagnesiumiodide | This alkyl did not react with GdCl$_3$. | | | | | |
| Dy | Trimethylsilylmethyllithium | .37 | Ketjen B | 800 | 85 | 41/50 | 133 |
| Dy | Butyllithium | .247 | Ketjen B | 800 | 85 | 2.2/34 | 16 |

TABLE 8

| | | Amount of Active Metal Loaded onto the Support | | | |
|---|---|---|---|---|---|
| THF:Gd | mmoles of metal per g. support | Support | Support Activation (°C.) | Polymerization Temperature (°C.) | Yield (g/g-min) | Activity (g/mmoles-hr) |
| 9.4:1 | .254 | Ketjen B | 800 | 85 | 136/51 | 630 |
| 29:1 | .29 | Ketjen B | 800 | 85 | 127/51 | 515 |
| 6:1 | .64 | Ketjen B | 800 | 85 | 179/50 | 336 |
| 6:1 | .95 | Ketjen B | 800 | 85 | 282/50 | 356 |
| 6:1 | 1.27 | Ketjen B | 800 | 85 | 127/52 | 115 |
| 3:1 | .64 | HPV | 800 | 85 | 417/50 | 782 |
| 3:1 | .95 | HPV | 800 | 85 | 636/50 | 803 |

That which is claimed is:

1. A process for polymerizing an alpha-olefin comprising contacting said alpha-olefin under polymerization conditions with a catalytic amount of a catalyst system comprising a catalyst produced by contacting an inorganic lanthanide halide with an ether in a suitable diluent, then contacting the resulting lanthanide composition with an alkali metal alkyl stabilized against beta-hydride elimination, and depositing the resulting lanthanide product on a particulate support.

2. A process according to claim 1 wherein said metal alkyl has the formula LiR wherein R is an alkyl radical having no hydrogen attached to the beta atom of the alkyl radical.

3. A process according to claim 2 wherein said metal alkyl is selected from the group consisting of bis(trimethylsilyl)methyl lithium, trimethylsilymethyl lithium, neopentyllithium, benzyl lithium, and 2-phenyl-2-methyl propyl lithium.

4. A process according to claim 2 wherein said metal alkyl compound is trimethylsilylmethyl lithium.

5. A process according to claim 2 wherein said ether is a cyclic or straight chain ether having 2 to 10 carbon atoms.

6. A process according to claim 4 wherein the mole ratio of said ether to said inorganic lanthanide halide is at least about 3 to 1.

7. A process according to claim 6 wherein said ether is tetrahydrofuran.

8. A process according to claim 7 wherein said particulate support is selected from silica, alumina, and silica alumina.

9. A method according to claim 8 wherein said particulate support is selected from highly porous alumina containing at least about 90 weight percent aluminum oxide and an internal porosity of at least about 0.5 ml/gm.

10. A process according to claim 9 wherein said alumina has been calcined at a temperature in the range of 600° to 800° C.

11. A process according to claim 10 wherein said alumina is rinsed in hydrocarbon and dried after being contacted with the lanthanide composition.

12. A process according to claim 11 wherein said inorganic lanthanide halide is selected from a group consisting of gadolinium chloride, praseodymium chloride, dysprosium chloride, terbium chloride, yttrium chloride, samarium chloride, erbium chloride, lanthanum chloride, cerium chloride, neodynium chloride, europium chloride, and holmium chloride.

13. A process according to claim 11 wherein said inorganic lanthanide halide consists essentially of gadolinium chloride.

14. A method according to claim 1 wherein said alpha-olefin consists essentially of ethylene.

15. A method according to claim 14 wherein said polymerization is conducted in the presence of an amount of hydrogen which increases the activity of said catalyst system.

16. A method according to claim 13 wherein said alpha-olefin consists essentially of ethylene.

17. A process according to claim 16 wherein said polymerization is conducted in the presence of an amount of hydrogen which increases the activity of said catalyst system.

* * * * *

UNITED STATES PATENT AND TRADEMARK OFFICE
CERTIFICATE OF CORRECTION

PATENT NO.   :   5,104,950

DATED        :   April 14, 1992

INVENTOR(S)  :   Shirley J. Martin et al

It is certified that error appears in the above-identified patent and that said Letters Patent is hereby corrected as shown below:

Column 9, line 30, please delete "claim 2" and insert therefor

---claim 5---.

Signed and Sealed this

Eighth Day of June, 1993

Attest:

MICHAEL K. KIRK

Attesting Officer

Acting Commissioner of Patents and Trademarks